US008833985B2

(12) United States Patent
Robertson et al.

(10) Patent No.: US 8,833,985 B2
(45) Date of Patent: Sep. 16, 2014

(54) MOBILE SOLAR-POWERED LIGHT TOWER

(75) Inventors: Daniel Lee Robertson, Raleigh, NC (US); Richard Warren Orff, Jr., Apex, NC (US); Earl Randolph Wingo, Jr., Raleigh, NC (US)

(73) Assignee: Progress Solar Solutions, LLC, Apex, NC (US)

(*) Notice: Subject to any disclaimer, the term of this patent is extended or adjusted under 35 U.S.C. 154(b) by 338 days.

(21) Appl. No.: 13/021,306

(22) Filed: Feb. 4, 2011

(65) Prior Publication Data

US 2012/0201016 A1    Aug. 9, 2012

(51) Int. Cl.
*B60Q 1/00* (2006.01)
*F21S 9/03* (2006.01)
*F21L 4/08* (2006.01)

(52) U.S. Cl.
CPC ... *F21L 4/08* (2013.01); *F21S 9/032* (2013.01)
USPC .......................................... 362/486; 362/431

(58) Field of Classification Search
None
See application file for complete search history.

(56) References Cited

U.S. PATENT DOCUMENTS

| | | | |
|---|---|---|---|
| 3,622,980 A | 11/1971 | Elledge, Jr. | |
| 3,883,846 A | 5/1975 | Bruner | |
| 3,914,756 A | 10/1975 | Seyk | |
| 4,261,329 A | 4/1981 | Walsh et al. | |
| 4,421,943 A * | 12/1983 | Withjack | 136/246 |
| 4,600,980 A | 7/1986 | Dahlgren | |
| 5,200,735 A | 4/1993 | Hines | |
| 5,463,595 A | 10/1995 | Rodhall et al. | |
| 5,542,203 A * | 8/1996 | Luoma et al. | 40/610 |
| 5,850,180 A | 12/1998 | Hess | |
| 5,969,501 A | 10/1999 | Glidden et al. | |
| 6,041,242 A | 3/2000 | Coulthard | |
| 6,049,273 A | 4/2000 | Hess | |
| 6,181,244 B1 | 1/2001 | Hall et al. | |
| 6,396,239 B1 | 5/2002 | Benn et al. | |

(Continued)

FOREIGN PATENT DOCUMENTS

| | | |
|---|---|---|
| BR | 9805481 | 8/2000 |
| GB | 2 339 747 | 9/2000 |
| JP | 2008 176935 | 7/2008 |
| WO | WO 2010 084212 | 7/2010 |

OTHER PUBLICATIONS

600 Watt Solar Power Generator with Light Tower Mast; http://www.magnalight.com/showproduct.aspx?productid=46702.

(Continued)

*Primary Examiner* — Sean Gramling
(74) *Attorney, Agent, or Firm* — Womble Carlyle Sandridge & Rice, LLP (57) ABSTRACT

Provided is a mobile lighting device that can derive power from a renewable energy source, such as solar power. The device can comprise a mobile base unit that can house one or more components of the device. The device further can comprise a solar power module associated with the mobile base unit that converts solar energy into electrical current. The device also can comprise a lighting module associated with the mobile base unit that is at least partially powered either directly or indirectly using the electrical current from the solar power module. The device further can comprise a solar power storage module, such as comprising one or more batteries, for storing energy and discharging as electrical current for powering the lighting module, which can be positioned atop a mast that can be extendable, pivotable, and/or rotatable. The invention also provides methods and systems for illuminating areas.

19 Claims, 7 Drawing Sheets

(56) References Cited

U.S. PATENT DOCUMENTS

| | | |
|---|---|---|
| 6,484,456 B1 | 11/2002 | Featherstone et al. |
| 6,783,258 B2 | 8/2004 | Ryan, Jr. |
| 6,831,557 B1 | 12/2004 | Hess |
| 7,112,891 B2 | 9/2006 | Johnson et al. |
| 7,135,990 B2 | 11/2006 | Richardson et al. |
| 7,193,508 B2 | 3/2007 | Hill et al. |
| 7,230,819 B2 * | 6/2007 | Muchow et al. ............. 361/601 |
| 7,388,348 B2 | 6/2008 | Mattichak |
| 7,397,369 B2 | 7/2008 | Zajac et al. |
| 7,465,108 B2 | 12/2008 | Brown |
| 7,492,120 B2 | 2/2009 | Benn et al. |
| 7,696,870 B2 | 4/2010 | Zajac et al. |
| 7,703,996 B1 | 4/2010 | Sexton, Jr. et al. |
| 7,731,383 B2 | 6/2010 | Myer |
| 7,795,837 B1 | 9/2010 | Haun et al. |
| 8,295,033 B2 * | 10/2012 | Van Straten ................. 361/601 |
| 2003/0025791 A1 * | 2/2003 | Kaylor et al. ................. 348/143 |
| 2005/0068765 A1 | 3/2005 | Ertze Encinas et al. |
| 2007/0285270 A1 * | 12/2007 | Gunn et al. ............... 340/693.6 |
| 2008/0068782 A1 | 3/2008 | Muchow et al. |
| 2008/0196758 A1 | 8/2008 | McGuire |
| 2008/0210289 A1 | 9/2008 | Chen |
| 2008/0310850 A1 | 12/2008 | Pederson et al. |
| 2009/0026842 A1 | 1/2009 | Hunter et al. |
| 2009/0079161 A1 | 3/2009 | Muchow et al. |
| 2009/0284963 A1 | 11/2009 | Intravatola |
| 2009/0288698 A1 | 11/2009 | Chen |
| 2010/0029268 A1 | 2/2010 | Myer et al. |
| 2010/0220467 A1 | 9/2010 | Daidone et al. |
| 2010/0232148 A1 * | 9/2010 | Sharpley et al. |

OTHER PUBLICATIONS

Portable Solar LED Light Tower for Military, Security, Emergency Response; http://www.greendiary.com/entry/portabie-solar-led-light-tower-for-military-security-emergency-response/.

Portable Solar Powered Floodlight; http://www.nationalsolaronline.com/documents/PortableSolarPoweredFloodlightBrochure_000.pdf.

Solar Power Generator for LED Lights; www.solarpowerengineering.com/2009/11.solar-power-generator-for-led-lights/.

The Progress Solar Light Tower—Mobile Unit; www.progress-solarsolutions.com/mobile%20solar%20light%20towers.html.

Towable Solar Security Lighting, NEST Energy Systems, Inc.; http://www.nestenergysystems.com/.

* cited by examiner

MOBILE SOLAR-POWERED LIGHT TOWER

FIELD OF THE INVENTION

The present invention relates to mobile lighting systems. More particularly, the invention relates to mobile lighting systems that make high efficiency use of solar energy for providing lighting at various locations.

BACKGROUND

Many outdoor activities that are performed during daytime hours may be performed during nighttime hours if an adequate light source is available. To accommodate outdoor activities during nighttime hours (such as large sporting events), floodlights or similar lighting devices are used. Such outdoor lighting, however, is typically permanently positioned and directly connected to an electric power grid.

Many nighttime activities benefit from the ability to provide lighting that is mobile. For example, much construction is carried out during nighttime hours to minimize any negative impact of the construction on local activities during daytime hours, which are typically busier. To provide mobile lighting, the field typically has relied upon lights coupled to electric generators and positioned on a trailer or similar device to make the unit mobile. Such generators may run on diesel, gasoline, or similar fuel. Although effective for providing mobile lighting, such known devices have limitations because of the operating expense and labor of constantly providing maintenance and fuel to power the generator, the significant noise associated with such generators, and the undesirable emissions related to fossil fuel combustion that not only can be environmentally detrimental but also can have potential adverse health effects on individuals working or otherwise located in the general vicinity of the fossil fuel-powered devices. Accordingly, there remains a need in the field for alternative devices capable of providing mobile light.

SUMMARY OF THE INVENTION

The present invention meets many needs in the art by providing functional, cost-effective, mobile lighting that can be powered by clean, renewable, solar energy that eliminates the dependency on fossil fuel in relation to providing such lighting and that also eliminates associated carbon emissions, as well as any noise pollution. In particular embodiments, the present invention relates to a mobile lighting system and device that provides excellent and useful lighting on-demand and at any site where the relatively compact device may be positioned. The system and device utilizes a renewable energy source, particularly solar energy, to charge and recharge an on-board battery or suite of batteries that provide power to a light emitting device (e.g., comprising light emitting diodes or "LED" floodlights) that is positioned atop a mast that can be adjusted to varying heights and orientations to most effectively light a defined area for a variety of uses, such as recreation events, camping, sports events, construction and other work activities, mining, security, emergency situations, airport uses, military operations, storm or disaster recovery, and the like.

In various embodiments, the invention can relate to a mobile solar lighting device that can include an extendable mast that is connected at one end portion to a base unit, and that is connected at an opposing end portion to a lighting module, such as a high output LED floodlight. The base unit may be constructed upon a device for facilitating mobility of the device, such as a trailer. The solar lighting device also can include one or more solar power modules (e.g., solar panels) that can be moved between modes that optimize mobility of the solar lighting device and modes that optimize receipt of solar energy and thus optimize charging. The inventive device further can include a battery or batteries (i.e., a battery "bank" or battery "suite") that can be housed in a housing unit that specifically can be attached to or formed on a trailer frame or floor/deck. The mast beneficially can be raised, lowered, and rotated to a variety of positions. In operation, the solar panels (or other renewable energy acquisition device) can be used to form electrical current that is used to charge the batteries. The charged batteries are useful to provide electrical power to a load such as the lighting module and thus provide a light source that, in various embodiments, is mobile, self-contained, renewable energy powered, emission-free, and noiseless.

In specific embodiments, a mobile, solar power lighting device according to the present invention may comprise the following: a base housing unit having two opposing side walls; one or more solar power modules pivotally attached to one or both of the opposing side walls of the base housing unit, the solar power modules being effective to convert solar energy into electrical current; one or more batteries positioned within the base housing unit, the one or more batteries being at least partially rechargeable using the electrical current formed by the solar power modules; a lighting module that is at least partially powered using the one or more batteries; and a mast having a first end section for connection to the base housing unit and having a second, opposing end section for connection to the lighting module, the mast being one or more of extendable, pivotable, and rotatable. In some embodiments, the base housing unit more particularly may include the following: a trailer frame; a front wall and a back wall interconnecting the two opposing side walls, wherein the front wall, back wall, and side walls are attached to the trailer frame; and a roof attached to the front wall, the back wall, and the opposing side walls. In specific embodiments, the roof of the base housing unit can include a recessed portion that extends along an approximate midline from front to back, and such recess can be useful for receiving the mast when pivoted in a down position. This beneficially assists in protecting the mast during transport and can reduce the profile of the device when in a transport configuration.

The base housing unit of the mobile, solar power lighting device can include a variety of further components for maximizing usefulness and effectiveness of the device. For example, in some embodiments, the base housing unit can include a coupling device (e.g., a towing bar and/or a trailer hitch) for facilitating towing of the mobile, solar-powered lighting device.

In further embodiments, the base housing unit can include at least one support component for supporting the mast. For example, the base housing unit may include a primary mast support component attached to the front wall of the base housing unit. In such embodiments, the first end section of the mast can be pivotally connected at a top portion of the primary mast support component such that the mast can be conveniently pivoted between a down position wherein the mast is substantially horizontal to the roof of the base housing unit and an up position wherein the mast is substantially vertical. Such pivotal connection of the mast to the primary mast support can be at a defined distance from a terminal end of the mast (or a section thereof). For example, the pivotal connection may be at a distance of about 1 foot to about 4 feet from a terminal end of the first end section of the mast. The primary mast support component also may include a lock component to assist in maintaining the mast in an up or substantially vertical position. Such lock mechanism may be located at a defined distance below the pivotal connection of the primary support to the mast. In specific embodiments, the lock component can be positioned to interact with the first end section of the mast below the pivotal connection to lock the mast in an up position. In further embodiments, the base housing unit may include a secondary mast support component (or even further mast support components). A secondary mast support, for example, may extend above the roof of the base housing unit and may receive the mast when it is in a down position. Specifically, the secondary mast support component can be located along the rear half of the base housing unit, may be referred to as a "cradle", and can have a substantial U-shape construction. The secondary mast support may include a locking component to prevent the mast from unintentionally disengaging the support.

Various elements of the base housing unit may be constructed to facilitate effective operation of the component used to collect a renewable energy source. For example, in specific embodiments, one or both of the opposing side walls can include a recessed portion that is substantially sized to the dimensions of the one or more solar power modules. In other words, the recess may be substantially the same length and width of the solar panels (including the solar energy collecting components and any structural components thereof, such as a back plate). The recess likewise may be substantially the same depth (or somewhat greater) as the thickness of the solar panels. This allows the solar power modules to substantially recess into the side walls of the base housing unit when the solar power modules are in a down or closed configuration. This provides support and stability to the solar power modules to prevent damage during transport. In some embodiments, the solar power modules may include a cover component that can be place over the exposed surface of the solar power modules to further prevent damage to the solar panels during storage and/or transport (e.g., to prevent impact damage to the solar panels). Such optional cover could be formed of a durable textile material, plastic, metal, composite material, or the like and may be permanently or removably attached to the solar power modules.

The base housing unit further may include components useful for facilitating movement of the solar power module (i.e., to assisting in pivoting or rotating the solar power module between a down or transport configuration and an up or active configuration). For example, the mobile, solar power lighting device can include an actuator that is attached to the base housing unit and also is attached to the solar power module (e.g., on the back surface or back plate of the solar wings or panels). The actuator in particular can be structured to controllably pivot the solar power module between a down position and an up position. Specifically, the down position may be such that the solar power module is substantially engaging the side wall (e.g., is positioned within the recess in the side wall). Pivoting of the solar power module can be such that the pivot point is at or near the top of the solar power module and at or near the top of the side wall. Specifically, the solar power module may be characterized as being pivotally attached to the side wall at a top portion of the sidewall. The actuator can be electronically controlled to pivot the one or more solar power modules to a defined angle relative to the ground, and the user-defined angle may be determined based upon the latitude of the global position of the device at the time of use. In further embodiments, the actuator may be positioned to be recessed in the side wall of the base housing unit behind the solar power module when the solar power module is in a down position. Thus, the side wall may be characterized as including one or more secondary recesses formed within the primary recess that receives the solar power module. Further, the side wall may include one or more openings to provide access to the interior of the base housing unit, and such openings may include an associated door. In certain embodiments, such opening and door may be located in the primary recess of a side wall (and thus be positioned behind the solar power module. In specific embodiments, each of the solar power modules can comprise a solar array with a power generation capacity of at least about 300 W.

A variety of materials may be used in the lighting module of the mobile, solar power lighting device of the invention. Preferably, the lighting module includes an illumination component that provides adequate lighting for a desired task, durability, relatively low power requirements, and a relatively long-life cycle operation. In specific embodiments, the lighting module may be selected from the group consisting of light emitting diodes, electrodeless induction floodlights, gas discharge lamps, and combinations thereof. In further embodiments, the lighting module can be formed of a first light bank and a second light bank, each bank being separately controlled for individual or simultaneous use. Even further banks of lights could be included, and each light bank could be formed of a single light or a plurality of lights (e.g., two, three, four, five, or even more lights per light bank). The lighting module may be electronically controlled to automatically turn the lights on and off at defined times, and the lighting module preferably may be switched between automatic and manual control.

The component of the mobile, solar power lighting device can be a single, continuous element or may comprise a plurality of "stages" or "sections". For example, the mast may be a two stage unit, a three stage unit, or may comprise even further stages. In some embodiments, the mast may be characterized as a telescoping construction wherein successive stages may nest within previous stages. Such construction can be beneficial to facilitate extension and contraction of the mast to alter the height thereof relative to the ground. In such extendable embodiments, the mobile, solar power lighting device further may include a winching component for moving the mast between an unextended position and an extended position. For example, the mast may be extendable such that when the mast is in an up position, the lighting module connected thereto can be positioned at a height of about 12 feet to at least about 25 feet relative to the ground. Further height options also can attained, as further described herein. As noted above, the mast may be pivotable (e.g., at the point of attachment to the primary mast support). In such embodiments, the mobile, solar power lighting device can include a winching component for pivoting the mast between a down position and an up position. Still further, the mobile, solar power lighting device may include components necessary to allow for rotation of the mast (or one or more sections thereof) so that the lighting module may be rotated to illuminate desired areas.

Although the batteries are primarily charged using the renewable resource (e.g., solar power), the mobile, solar power lighting device may include further components for charging the batteries. For example, the device may comprise alternate means for using a renewable resource to achieve electrical current for charging the batteries, such as a wind mill or similar device for using wind power as the energy source. In specific embodiments, the inventive device may include a secondary battery charging component that functions to recharge the batteries using an alternating current or direct current source. Specifically, a conventional charging device that plugs into a standard 110V or 220V outlet may be included.

The mobile, solar power lighting device also may include a unit control module that includes elements for controlling the lighting module, positioning of the solar power modules, and even further components of the device. Such unit control module may be located in a further control box or control panel housing. Thus, the unit control module may be characterized as including one or more user-accessible controls for one or both of turning the lighting module on and off and actuating the one or more solar power modules between a down position and an up position.

In further embodiments, the invention may be characterized as providing a solar power device that comprises the following: a mobile base unit; a solar power module associated with the mobile base unit that converts solar energy into electrical current; and a lighting module associated with the mobile base unit that is at least partially powered either directly or indirectly using the electrical current from the solar power module. In some embodiments, the solar power module may be described as comprising a back plate. The solar power device further can include a battery that is at least partially rechargeable using the electrical current from the solar power module and that provides power to the lighting module. The solar power device also can include a unit control module that can include one or more components that control one or more of the solar power module, the battery bank(s), and the lighting module. The solar power device also can include a mast that is attached to the lighting module and the mobile base unit. The mast preferably can be one or more of extendable, pivotable, and rotatable. In embodiments wherein the mast is pivotable, the device further can include a winching component for moving the mast between a down position and an up position. In embodiments wherein the mast is extendable, the device further can include a winching component for moving the mast between an unextended position and an extended position. In other embodiments, the solar power device can include one or more actuator(s) connected to the mobile base unit and the solar power module. In specific embodiments, the mobile base unit can comprise a trailer. In other embodiments, the solar power module can rotate between a closed position and one or more open positions. In additional embodiments, the lighting module can be selected from the group consisting of light emitting diodes, electrodeless induction floodlights, gas discharge lamps, and combinations thereof.

In yet additional embodiments, the invention can be characterized as providing a mobile, solar-powered lighting device comprising two or more independent off-grid solar-powered electric systems. In particular, each of the solar-powered electric systems can comprise components for converting solar energy into electrical current, components for storage of electrical current, and electrical light emitting components. Further, the device can comprise system control components that control one or more of the solar energy converting components, the electrical current storage components, and the light emitting components. The device further can comprise a base housing unit that houses the electrical current storage components and to which is attached the solar energy converting components, the light emitting components, and the system control components. More specifically, the base housing unit can comprise a trailer frame with a floor upon which is provided two opposing side walls interconnected with a front wall and a back wall, and a roof connected to the side walls, front wall, and back wall. The solar energy converting components specifically can comprise a solar wing pivotally attached at a top portion thereof to a top portion of the side wall. The solar wing can comprise one or more photovoltaic solar arrays.

The device further can comprise a mast attached at a first end section to the base housing unit. The mast also can have a second, opposing end section to which is attached the light emitting components. The mast can be one or more of extendable, pivotable, and rotatable. The electrical current storage components can comprise two or more battery banks each comprising one or more batteries being at least partially rechargeable using the electrical current formed by the solar energy converting components. The light emitting components can comprise two banks formed of two or more light units each, the light units individually being one or both of pivotable and rotatable.

In a further aspect, the present invention also provides methods of lighting or illuminating a defined area. In specific embodiments, such methods may comprise the following steps: causing a mobile, solar power lighting device as described herein to be positioned in or about the defined area to be illuminated; and causing the device to emit light and thus illuminate the defined area.

In another aspect, the invention can provide methods of utilizing a mobile, solar power lighting device. For example, in certain embodiments, such methods may comprise the following: configuring a mobile solar power lighting device in a transport mode; transporting the mobile solar power lighting device; configuring the mobile solar light tower in a charge mode; charging a battery using a solar power module associated with the mobile solar power lighting device; configuring the mobile solar power lighting device in a lighting mode; and lighting an area. The invention in some embodiments enables setup for automatic, unattended, long-term use by setting up the solar powered lighting device and allowing it to remain in a charge mode during the day followed by use in a lighting mode at night for one or more nights. In specific embodiments, configuring the mobile solar power lighting device in a transport mode can include placing a mast in a down position and placing the solar power module in a down, protected position. Further, transporting can include towing the mobile solar power lighting device with a vehicle. In other embodiments, configuring the mobile solar light tower in the charge mode can include placing the solar power module into a position to optimize receipt of sunlight. Also, configuring the mobile solar power lighting device in the lighting mode can include raising a mast into a substantially upright position.

In yet another aspect, the invention can provide systems for lighting an area using a renewable energy source. In certain embodiments, such system can comprise the following: an energy acquisition component acquiring energy from the renewable energy source; a protective component for protecting the energy acquisition component; a lighting module for lighting the area; and a raising component for raising the lighting module. In further embodiments, the system can include a transporting component for transporting the system. Specifically, the transporting component may be a trailer. In other embodiments, the system can include a battery for storing the acquired energy and providing the stored energy to the lighting module in the form of electrical current. Still further, the system can include a control component for controlling one or both of the lighting module and the energy acquisition component. In some embodiments, the raising component of the system can include a pivotable, extendable mast connecting the lighting module and the transporting component. Specifically, the extendable mast may be extendable and pivotable between a down position and an up position. In other embodiments of the system, the raising component can include a winching component for moving the extendable mast between the down position and the up position. The protective component of the system can include an actuator that controllably moves the energy acquisition component. The energy acquisition component of the system may be rotatable to an open position to optimize acquisition of the renewable energy and a closed position to protect the energy acquisition component. In specific embodiments, the lighting module of the inventive system may include lighting units that can selected from the group consisting of light emitting diodes, electrodeless induction floodlights, gas discharge lamps, and combinations thereof.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In certain aspects, the present invention provides mobile, solar-powered lighting devices. The devices are compact, durable, and useful to provide excellent, high efficiency lighting at various sites without associated emissions, noise, or need for fossil fuels.

In certain embodiments, a mobile, solar-powered lighting device according to the invention generally can comprise a base housing unit, one or more solar power modules pivotally attached to the base housing unit, one or more batteries positioned within the base housing unit, a lighting module, and a mast that may be extendable, pivotable, and/or rotatable and that is effective to connect at one end portion to the base housing unit and at an opposing end portion to the lighting module. Beneficially, the solar power modules and the mast may be positioned in a compact, closed, unextended, or down position to facilitate ease of transport of the device, and the solar power modules and the mast may be positioned into an open, extended, or up position to optimize receipt of radiant solar energy and/or optimize lighting provided by the device.

Figure 1:
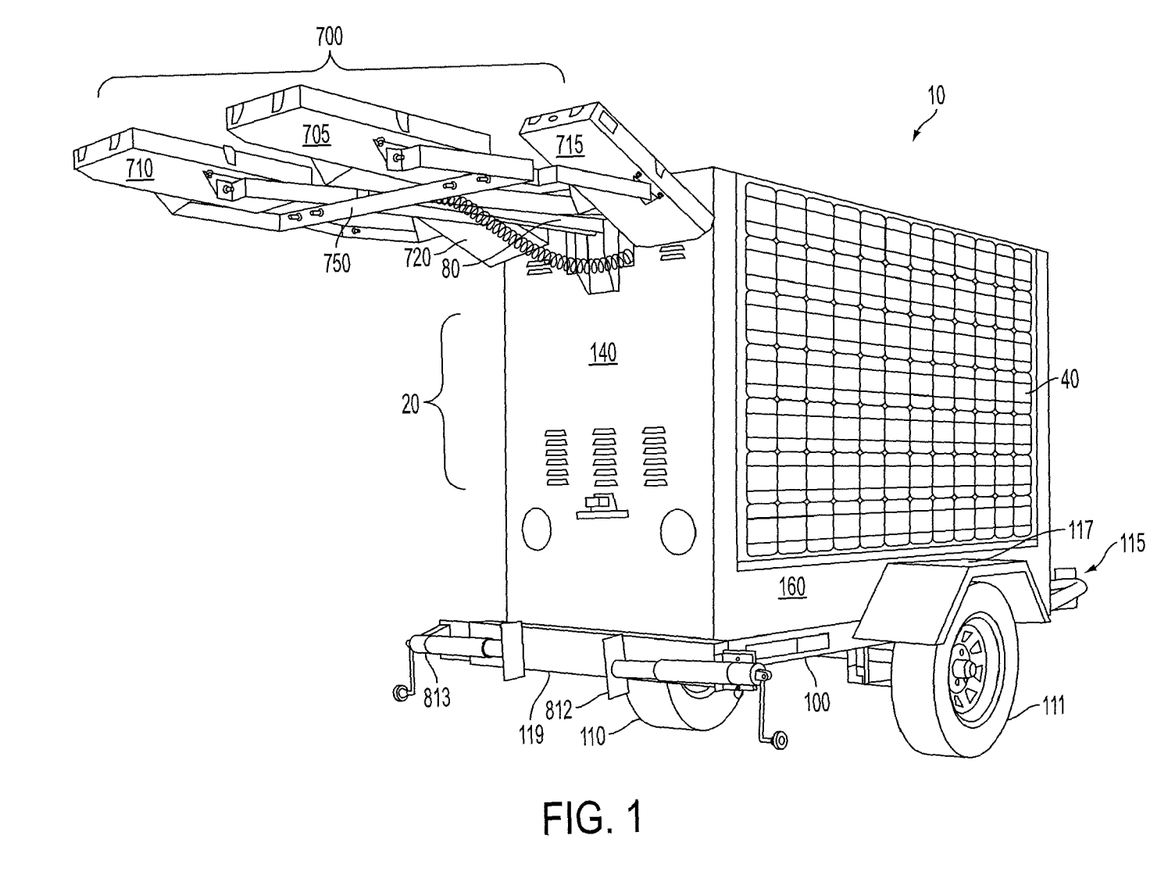
FIG. 1 is a rear perspective view of a mobile, solar-powered lighting device according to an embodiment of the invention in a closed or travel configuration.

A mobile, solar-powered lighting device 10 according to one embodiment is shown in FIG. 1, wherein the device typically would be described as being in a travel or transport mode, a compact mode, or the like. In this rear, perspective view, it can be seen that the mobile, solar-powered lighting device 10 generally comprises a base housing unit 20, a solar power module 40, a lighting module 700, and a mast 80 (which may be referred to as a light tower mast). In the illustrated embodiment, the lighting module 700 comprises four separate lighting units. In some embodiments, the lighting module 700 and the mast 80 may be referred to in combination as a light tower.

In certain embodiments, the base housing unit 20 can comprise various specific components. For example, the base housing unit 20 can be formed of a trailer frame 100, which can include two or more wheel units (110 and 111 in FIG. 1) and any necessary accessory components (e.g., axles, shocks, lights and other electrical components, stabilizing components, towing components, etc.) to form a usable, mobile trailer device upon which the base housing unit 20 may be constructed. The trailer 100 specifically may further comprise a coupling device 115 (e.g., a trailer hitch) useful for facilitating connection of the mobile, solar-powered lighting device 10 to a suitable vehicle for towing. Such coupling device 115 is more clearly shown in the embodiment illustrated in FIG. 2, wherein the coupling device 115 is an extension of the towing bar 114.

The base housing unit 20 further may comprise a plurality of walls, such as a front wall 120, a back wall 140, and two opposing side walls (160 and 180). The two opposing side walls (160 and 180) specifically can be characterized as being interconnected by the front wall 120 and the back wall 140. The plurality of walls preferably can be attached along one or more of the bottom edges thereof to the trailer frame 100 and along one or more of the top edges thereof to a roof 195 to form a single, coherent base housing unit 20 that may enclose one or more further components of the mobile, solar-powered lighting device 10, as further described herein. The side walls, trailer frame, and roof may be interconnected via any suitable means, such as bolting, screwing, welding, or the like, or a combination thereof. One or more of the walls may include venting components, including both active (e.g., powered fans or the like) and passive (e.g., openings alone) venting.

Figure 2:
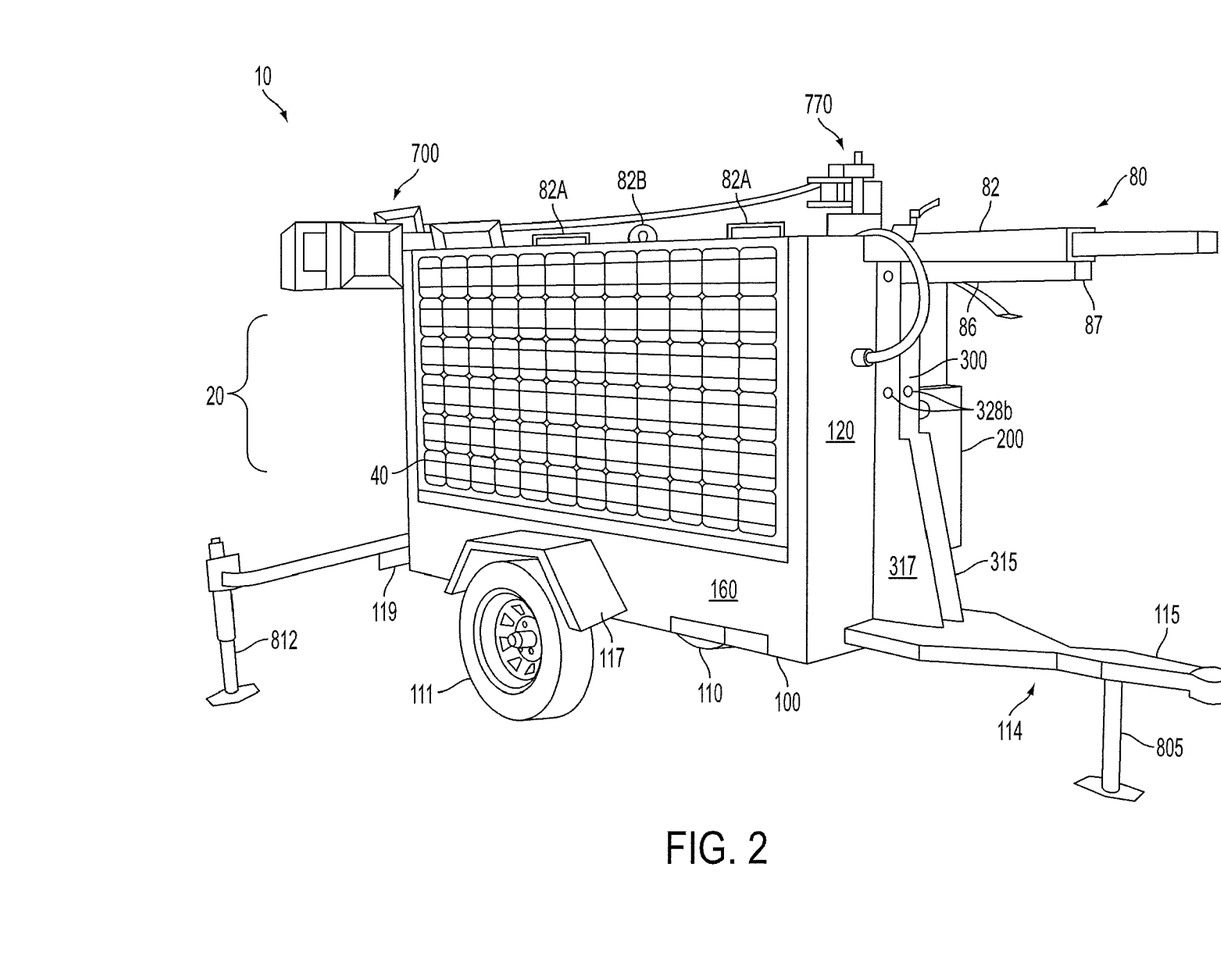
FIG. 2 is a front perspective view of a mobile, solar-powered lighting device according to an embodiment of the invention in a closed or stabilized position.

In the configuration illustrated in FIG. 1 and FIG. 2, the mast 80 is positioned in a down or lowered position so that the mobile, solar-powered lighting device 10 can be safely transported without danger of damage to the device and without danger of the mast 80 and the lighting module 700 attached thereto inadvertently coming into contact with other objects. Additionally, in the illustrated configuration, the solar power module 40 is in a closed or down position so that the solar power module 40 is protected in light of the reduced profile in relation to an open or up position. Moreover, as is further evident with reference to the additional figures provided herewith, in certain embodiments, the sidewalls (160 and 180) may be formed to have a solar module-receiving recessed portion (161 and 181, respectively) such that the solar power module can partially or completely recess into the side wall to further protect the solar power module from inadvertently hitting other objects. As seen in FIG. 1, for example, the exterior surface of the solar power module 40 is substantially flush with the side wall 160 and both the solar power module 40 and the side wall 160 are positionally within the outer dimension of the fender 117 of the trailer frame 100.

The mobile, solar-powered lighting device 10 of the invention is particularly beneficial because it can be moved to practically any outdoor area (or indoor areas as sized appropriately) to provide a source of lighting. Once the mobile, solar-powered lighting device is transported to the desired position, the device can be set up for actual use to light an area and/or to optimize retrieval of solar radiation to charge the batteries of the device. In the embodiment shown in FIG. 3, the mobile, solar-powered lighting device 10 can be characterized as being in an open, working, or lighting configuration. Specifically, the solar power modules (40 and 50) are pivoted away from the base housing unit 20 to take on a defined angle relative to the ground, and thus may be characterized as being in a charging position or a position that optimizes charging. Further, the mast 80 has been pivoted in relation to the down position illustrated in FIG. 1 and FIG. 2 to be in an up or lighting position. Additionally, the mast 80 is extended to increase the length thereof, and this embodiment thus illustrates a multi-stage construction wherein the mast 80 comprises a first mast section 82, a second mast section 84, and a third mast section 85. Such construction may be referred to as a telescoping construction. More or fewer mast sections may be provided.

Figure 4:
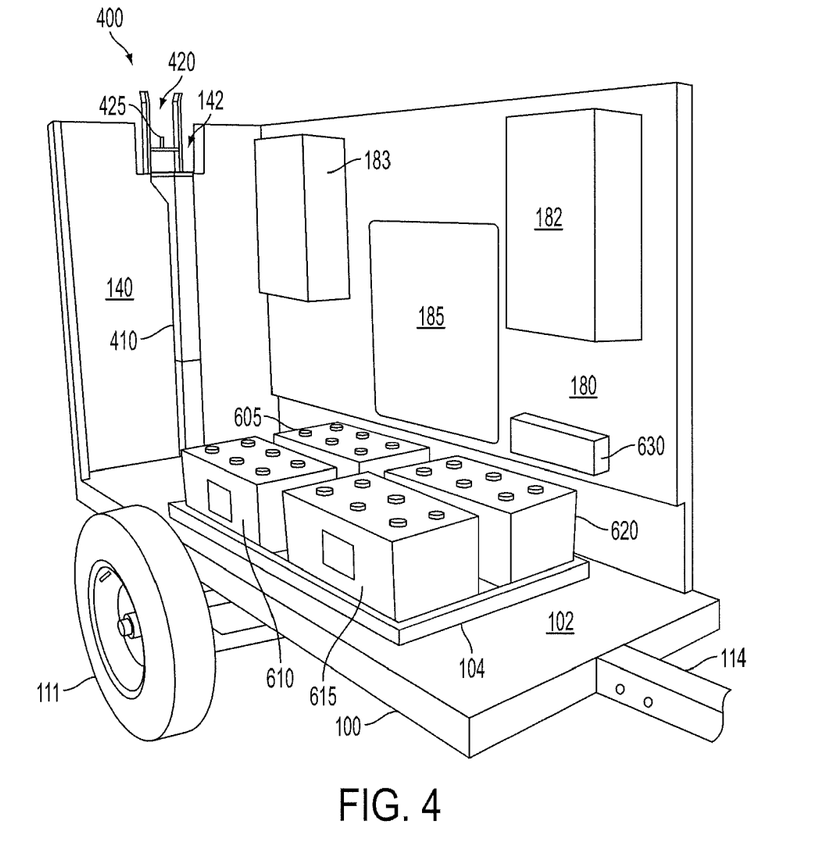
FIG. 4 is a cut-away, perspective view of the interior of the base housing unit of a mobile, solar-powered lighting device according to an embodiment of the invention.

The mobile, solar-powered lighting device 10 beneficially provides excellent lighting ability, high durability, low maintenance, and ease of use. These characteristics can be recognized in relation to the construction of the device according to the present invention, such as a partially constructed base housing unit 20 illustrated in the embodiment of FIG. 4. A trailer frame 100 useful according to the invention may take on any shape, size, or configuration that is useful to provide the mobile, solar lighting device 10 with desirable characteristics and/or to facilitate the useful implementation of the device in conditions where mobile lighting needs are required. As seen in FIG. 4, the trailer frame 100 can include a floor 102 (which can include a battery bank base stabilizing frame 104) and other standard frame components of a trailer such as wheels 111, an axle (not visible), tail lights, and any further components that may be useful on such a trailer, such as support members. For example, the trailer frame 100 can include a towing bar 114 or similar component extending from the front end thereof. Such towing bar 114 can be a member of the coupling device 115 or may be characterized as a member of the trailer frame 100 to which the coupling device 115 is attached. For example, the coupling device 115 could specifically be a trailer hitch or coupler that is connected to the towing bar 114.

The trailer frame may be constructed out of any material useful to provide sufficient strength and durability, such as stainless steel, other metals and alloys, plastics, wood, composites, other materials, or any combination thereof. In one embodiment, the trailer frame is constructed of steel, aluminum, or the like.

The further components of the base housing unit 20 likewise may be formed of any suitable material for providing requisite properties as described herein. For example, the front wall 120, back wall 140, side walls (160 and 180), floor 102, and roof 195 may particularly be formed of steel, aluminum, or any further metal or alloy providing strength and durability to the overall device. Of course, the invention is not limited to such materials, and rather encompasses the use of further materials, such as plastics, composites, and the like. The base housing unit 20 preferably is constructed to provide durability to the device and to protect and maximize functionality of the solar power modules, the solar power storage module components, the solar control module components, and the light tower components. The base housing unit 20 and/or trailer 100 may include any associated components required for road transport, including necessary lighting components (e.g., brake lights, turn signals, and associated electrical components), licensing elements, and the like.

Figure 3:
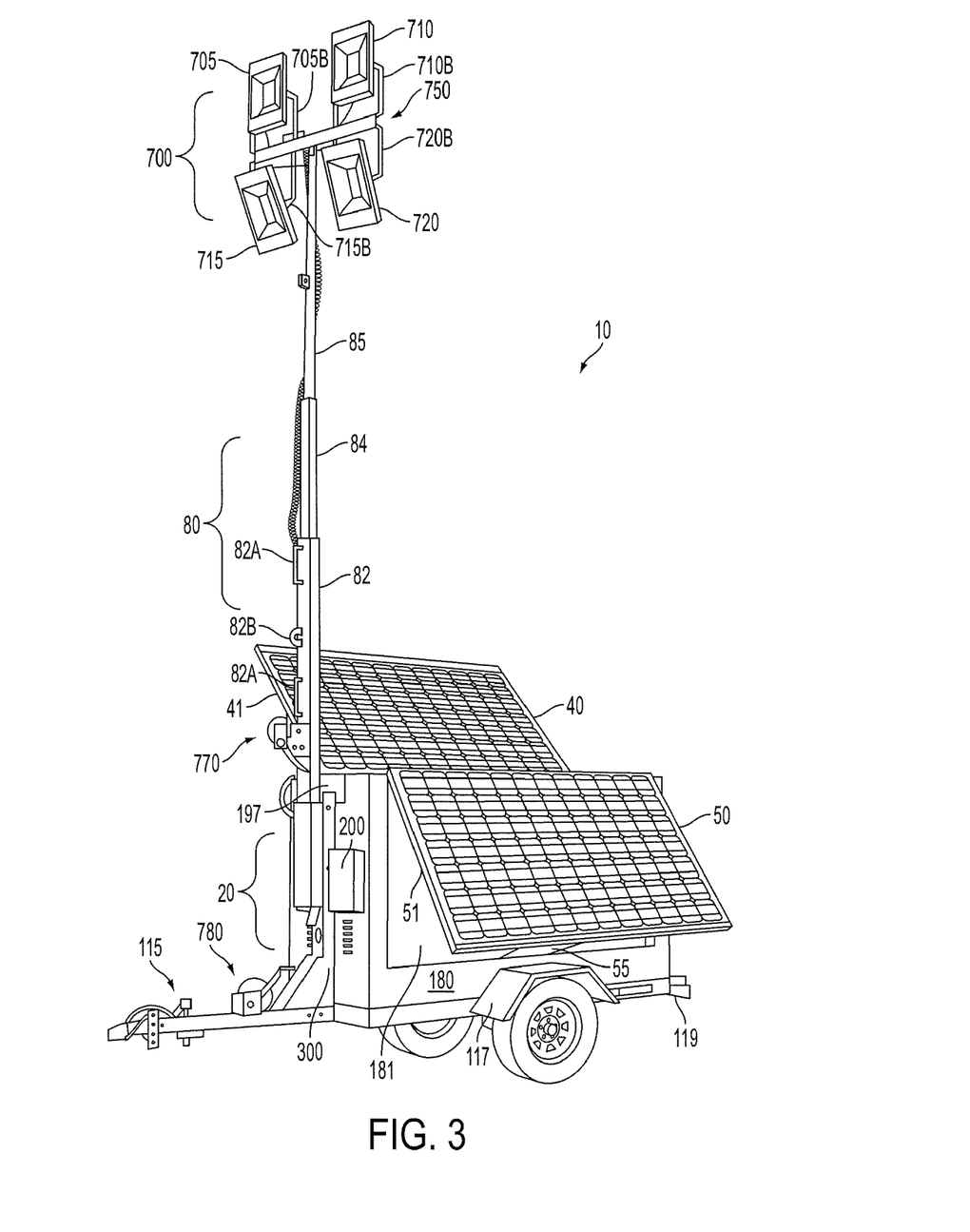
FIG. 3 is a front perspective view of a mobile, solar-powered lighting device according to an embodiment of the invention with the mast in an up and extended position and with the solar power modules in a raised or up position.
Figure 5:
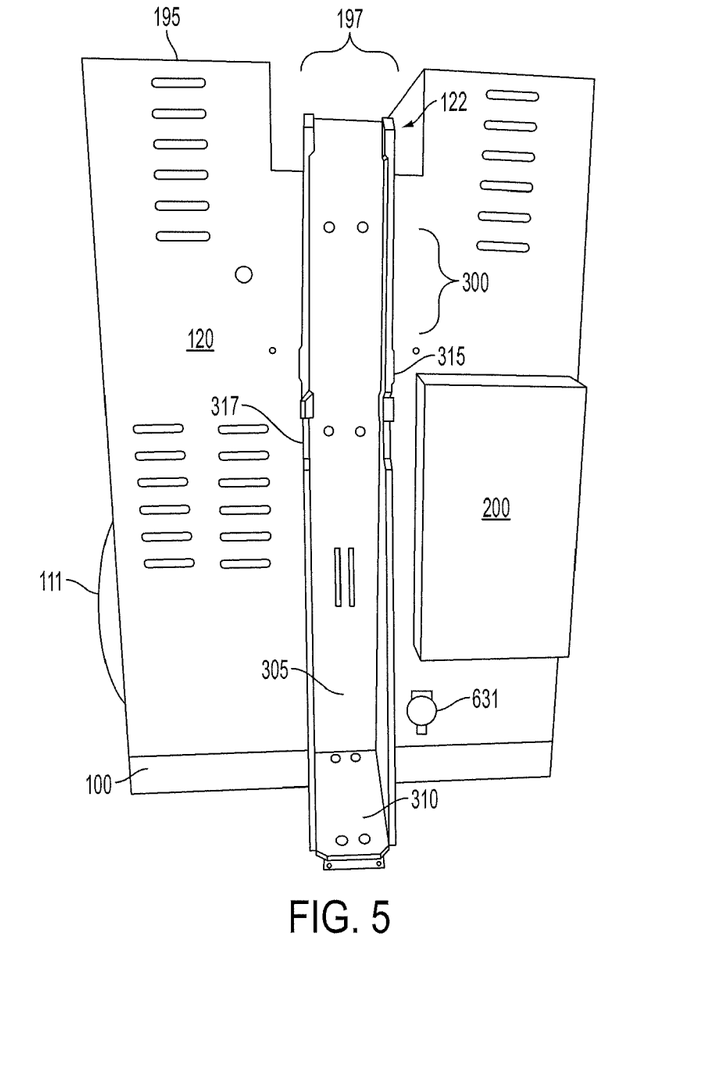
FIG. 5 is a front view of the base housing unit of a mobile, solar-powered lighting device according to an embodiment of the invention.

The further components of the base housing unit 20 further may be provided with specific characteristics to facilitate desired functions and/or properties of the inventive mobile, solar lighting device 10. For example, as seen in FIG. 3 and FIG. 5 in particular, the roof 195 of the lighting device 10 may comprise a recessed portion 197 that extends along the length of the lighting device 10 from the front wall 120 to the back wall 140. Thus, the front wall 120 and back wall 140 may likewise be characterized as comprising a recessed portion (122 and 142, respectively) at the top portion thereof. These recessed portions are beneficial for receiving the mast 80 when it is in a down or travel configuration, as shown in FIG. 1 and FIG. 2. As seen therein, the portion of the mast 80 intersecting the roof 195 is not visible as such portion of the mast 80 rests preferentially at or below the level of the roof top. Such configuration can be beneficial to provide safety and support to the mast during transit and to reduce the overall profile of the lighting device 10 in the closed configuration. Preferentially, the recessed portion 197 of the roof 195 may be substantially along an approximate midline from the front to the back of the base housing unit 20.

Figure 7:
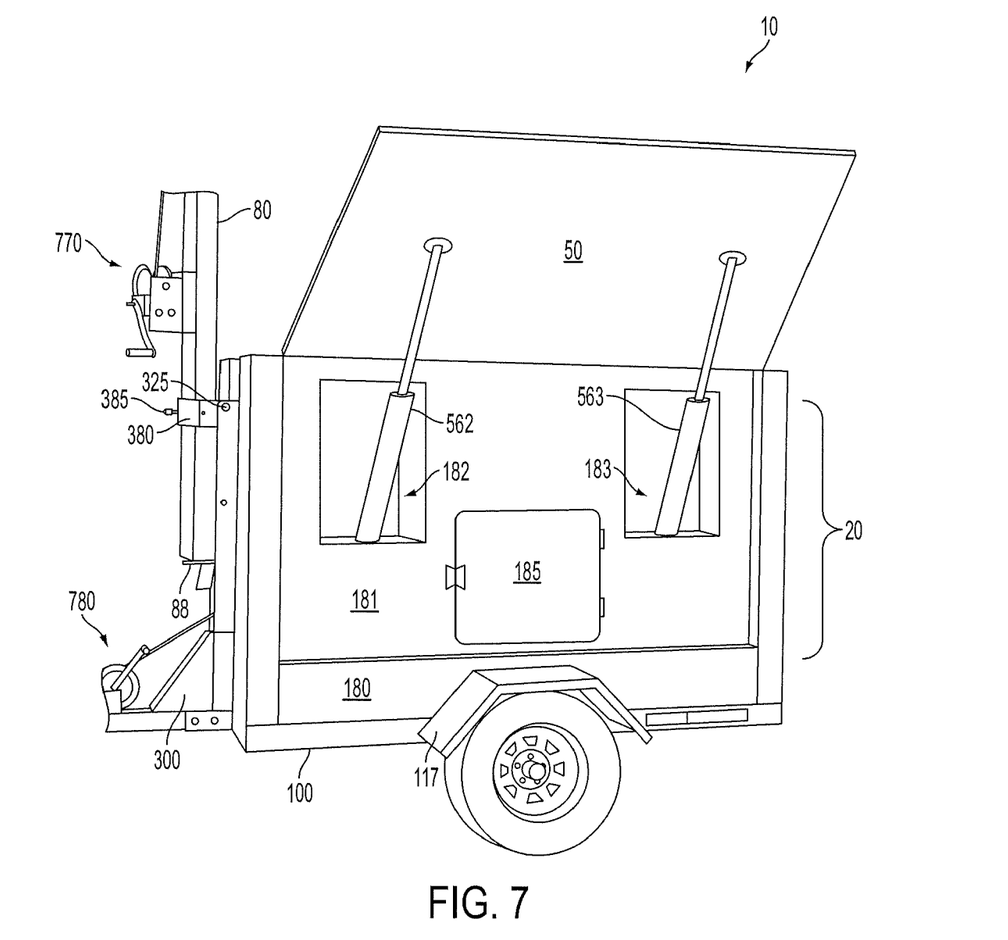
FIG. 7 is a side view of a mobile, solar-powered lighting device according to one embodiment of the invention with the solar power module raised showing detail of components behind the module.

As seen in FIG. 3, FIG. 4, and FIG. 7, the side walls (160 and 180) similarly can include various recessed portions. For example, the side wall 180 as seen in FIG. 3 includes a primary recess 181 (which may be referred to as a solar module recess in that it accepts the solar module in the down position) that is similarly sized and shaped to the solar power module 50. The solar power module 50 thus is pivotally attached to the top portion of the side wall 180 such that when the solar power module 50 is in a fully lowered or down position, the solar power module engages the primary recess 181. Specifically, in such position, the solar power module 50 may be substantially flush with the exterior surface of the side wall 180. In other embodiments, such as when the solar power module is substantially larger, the solar power module may engage the primary recess and thus be recessed in part in relation to the outer surface of the side wall without the outer surface of the solar power module being flush with the outer surface of the side wall. In some embodiments, the solar power module in the down position can be characterized as resting against the side wall. The sidewall 180 likewise can include secondary recesses (182 and 183), as seen in FIG. 4 (or secondary recesses 162 and 163, as seen in FIG. 7). As further described below in relation to FIG. 7, such secondary recesses can be beneficial for placement of additional components of the mobile, solar-powered lighting device 10. As seen in FIG. 4 and FIG. 7, the side wall 180 further can comprise a door 185 to provide access to the interior of the base housing unit 20 as needed. Of course, it is understood that the description of the recesses and/or openings present in one side wall 180 can be similarly or identically present in the opposing side wall 160.

In addition to the recessed portion 197 of the roof 195, as discussed above, the base housing unit 20 can comprise further components in relation to the mast 80. Specifically, the base housing unit 20 may comprise at least one component for supporting the mast in one or both of a down or travel configuration and an up or lighting configuration. For example, as shown in FIG. 5, the base housing unit 20 may comprise a primary mast support component 300 attached to the front wall 120 thereof. In this embodiment, the primary mast support 300 comprises a vertical plate 305 attached to the front wall 120 and a horizontal plate 310 that can attach to the towing bar 114 extending from the front of the trailer frame 100. The horizontal plate 310 can provide added strength but may be optional. The primary mast support 300 further can comprise two opposing side plates (315 and 317) such that the primary mast support 300 can have a substantially U-shaped horizontal cross section. Preferably, the distance between the side plates (315 and 317) is substantially similar to and no less than the width of the mast 80 in the section of the mast 80 that will interact with the primary mast support 300 as described herein. The primary mast support 300 can be formed of any suitable material, such as any material of which the trailer frame 100 and/or the base housing unit walls (120, 140, 160, and 180) may be formed. In specific embodiments, the primary mast support is formed of steel or another metal or metal alloy.

Figure 6:
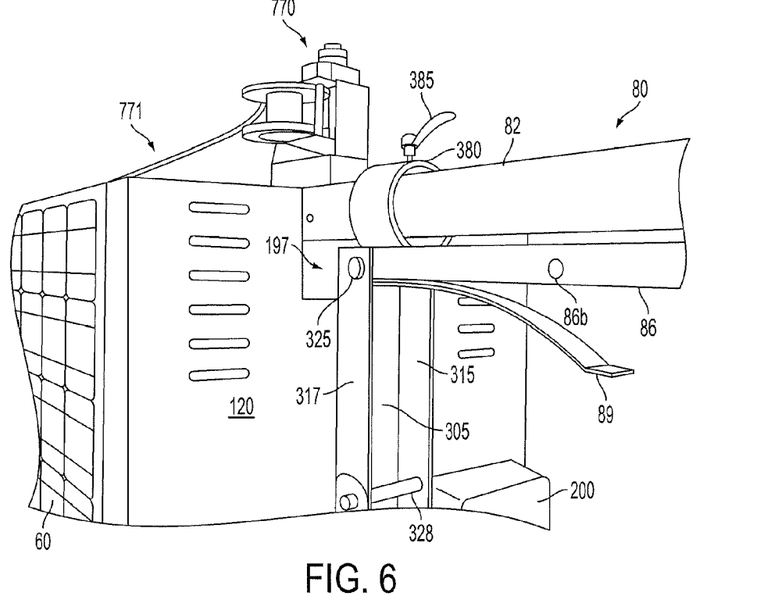
FIG. 6 is front perspective view showing detail of the mast and associated components of a mobile, solar-powered lighting device according to one embodiment of the invention.

The pivotal attachment of the mast 80 to the primary mast support 300 is illustrated in the embodiments shown in FIG. 2 and FIG. 6. In the illustrated embodiments, the mast 80 comprises a first mast section 82 (which may be described as a bottom section—or stage—or outer telescoping portion) that is pivotally connected to a top portion of the primary mast support 300. In the illustrated embodiments, the first mast section 82 of the mast 80 further comprises a mast base 86 that interconnects the first mast section 82 to the primary mast support 300 at the pivotal connection point 325. Such pivotal connection point can be constructed to be substantially permanent (e.g., a rivet or bolt attachment) or removable (e.g., a locking pin arrangement). In this embodiment, the first mast section 82 still is considered to be pivotally connected to the primary mast support 300, such connection simply being facilitated with the use of the mast base 86. Such mast base 86 can be useful to assist in spacing the mast 80 from the base housing unit 20 to facilitate secure connection in all configurations. In other embodiments, the first mast section 82 of the mast 80 could be directly attached to the primary mast support 300 instead of the indirect attachment illustrated in FIG. 6. When the mast base 86 is present, it may be useful for it to be aligned with the mast 80 such that the terminal end 87 of the mast (or of the first mast section) is substantially aligned with the terminal end of the mast base 86. In some embodiments, the mast base 86 may include an end plate 88 that can function to substantially align the terminal ends of the components and provide support to the terminal end of the mast 80 when in the upright or vertical position.

The pivotal connection of the mast 80 to the primary mast support 300 can be dimensionally characterized in relation to the position of the pivot point on the mast 80. In specific embodiments, the pivot point (or the point of the pivotal attachment) can be on the first mast section 82 of the mast 80 at a defined distance from the terminal end 87 of the first mast section 82 (which can correlate to the same point on the mast base 86 in applicable embodiments). Particularly, the pivotal connection of the mast 80 to the primary mast support 300 can be at a distance of about 1 foot to about 4 feet, about 2 feet to about 4 feet, or about 3 feet to about 4 feet from the terminal end 87 of the first mast section 82 of the mast 80 (or the terminal end of the mast itself if it comprises only a single section). In other words, the terminal end 87 of the first mast section 82 of the mast 80 extends beyond the point of pivotal connection with the primary mast support 300 by a distance of at least about 1 foot, at least about 2 feet, or at least about 3 feet. In embodiments wherein the mast 80 pivotally connects to the primary mast support 300 through the mast base 86, the distance from the pivotal connection of the mast base 86 to the primary mast support 300 may be similar or identical to the above-described parameters.

The primary mast support 300 can comprise a locking mechanism for securing the mast 80 in an up or lighting position. In certain embodiments, the side plates (315 and 317) of the primary mast support 300 can comprise apertures 328b for receiving a mast locking pin 328. Accordingly, the mast 80, the first mast section 82, or mast base 86 (depending upon the specific embodiment) would include an opening 86b extending therethrough that aligns with the apertures 328b in the side plates (315 and 317) such that the mast locking pin 328 will slide through the apertures 328b and the opening 86b to thus interlock the components. In the embodiment of FIG. 6, the opening 86b is present in the mast base 86. Such up and locked configuration can be seen in FIG. 3. The locking component thus can be characterized as being located at a defined distance below the pivotal connection between the primary mast support 300 and the mast 80. As described above, the lock component thus interacts with the first mast section 82 below the pivotal connection to lock the mast 80 in the up position. The mast base 86 (or the mast 80, generally) may include one or more elements for stabilizing the mast 80 in the up position. For example, as shown in FIG. 6, a bias bar 89 may be included to provide tension on the mast 80 when in the up position to tension the mast 80 against the lock component.

In the embodiment shown in FIG. 4, the base housing unit 20 further comprises a secondary mast support 400 extending above the roof 195 for receiving the mast 80 when in a down position. In this embodiment, the secondary mast support 400 comprises a vertical beam 410 that is connected to the back wall 140 and the floor 102 of the trailer frame 100 to better distribute the supported mast weight. The secondary mast support 400 further comprises a top cradle 420 that receives the mast 80 and that includes two upright members to substantially prevent side-to-side movement of the mast during transport. The secondary mast support 400 preferably is located at some position in line (e.g., substantially centered side-to-side in the base housing unit 20) with the primary mast support 300 along the rear half of the base housing unit 20. Thus, the vertical beam 410 could be free-standing within the base housing unit attached only to the floor 102 (and optionally to the roof 195). In specific embodiments, the secondary mast support 400 may be integrally formed with the back wall 140 of the base housing unit 20. Further, the secondary mast support 400 may be interconnected with the back wall 140, such as by screwing, bolting, welding, or the like, or combinations thereof, along the entire length of the secondary mast support or at discrete points on the secondary mast support. The top cradle 420 can comprise a substantially vertically aligned positioning/locking pin 425 that can interact with the mast 80 via an aperture formed therein (or in one or more of the various mast section) to secure the mast in position within the top cradle 420. The secondary mast support 400 further may comprise a horizontal locking pin 430 that can pass through apertures formed in the opposing, vertical sides of the top cradle 420 to substantially prevent the mast 80 from unintentionally disengaging the support during travel and to securely lock the mast 80 to the secondary mast support 400. The combination of components in the secondary mast support 400 is useful to provide the structure and strength to enable the entire mobile, solar-powered lighting device 10 to be lifted off of the ground or a truck, such as by using a forklift or a crane. To facilitate such movement of the device, the base unit can include forklift gloves 82A and/or a crane eye 82B that can be attached to the mast 80, such as on the first mast section 82. As seen in FIG. 2, the forklift gloves 82A and crane eye 82B can be positioned so as to be visible and properly oriented at the top of the mobile, solar-powered lighting device 10 when the mast 80 is in the down or horizontal position and is locked into place in the secondary mast support 400.

The base housing unit 20 can comprise one or more components useful to facilitate stabilization of the unit in the use or lighting mode, particularly when detached from the towing means. Referring to FIG. 1 and FIG. 2, the base housing unit 20 can comprise a tongue jack 805 that is permanently or removably connected to the towing bar 114 or the coupling device 115. Such tongue jack 805 can be effective to maintain the mobile, solar-powered lighting device 10 in a substantially level position (i.e., front-to-back). The base housing unit 20 further can comprise components at the rear portion thereof for providing additional stabilization and support to the device. For example, as seen in FIG. 2, a right rear outrigger 807 and a left rear outrigger (not visible) can be associated with the back bumper 119 and may have a telescoping engagement therewith (e.g., horizontally) or may be self-contained and attached to the rear bumper 119. A right rear jack stand 812 and left rear jack stand 813 can be attached to the rear outriggers and can be extendable for use in leveling and supporting the device. Optionally, the mobile, solar-powered lighting device 10 can include front outriggers and front jack stands that are substantially identical to the above-described and illustrated rear components. The rear jack stands and optional front jack stands can be height adjustable and can be locked into position, and these components can be particularly useful to facilitate side-to-side stability of the mobile, solar-powered lighting device 10, particularly when the rear outriggers and optional front outriggers are deployed.

The solar power modules (40 and 50) pivotally attached to the opposing side walls (160 and 180) can comprise any type of component useful to convert solar radiation or energy into electrical energy or current. In some embodiments, the solar power modules may be characterized as comprising solar panels. As such, the solar power modules may comprise the active components (i.e., photovoltaic components) for converting solar energy into electrical current and may further comprise other structural components, such as back plates (41 and 51), which can in certain embodiments be referred to generally as the solar wings. The solar power modules (40 and 50) may in particular be configured to pivotally connect to the opposing side walls (160 and 180). The back plates (41 and 51) further can function to provide a structural support for attachment of further components in relation to the solar power modules (40 and 50) without causing damage to the active components thereof. In specific embodiments, the solar power modules (40 and 50) may be characterized as comprising a plurality of components. For example, a single solar power module may comprise a solar wing (which provides structural support, such as a back plate), one or a plurality of solar arrays (which can comprise the photovoltaic components), and optional module covers that can be placed over the exterior surface of the solar power modules to provide additional protection and prevent charging of the device. Preferably, the solar power modules (40 and 50) are effective to provide sufficient electrical current to charge and re-charge one or a series of batteries over many charge cycles such that the batteries can provide sufficient electrical current to power the lighting modules of the mobile, solar-powered lighting device 10. Preferably, sufficient electrical current is provided for deep-cycle charges and re-charges for one or more battery banks as otherwise described herein. In specific embodiments, the solar power modules (40 and 50) may each comprise a mono-crystalline solar array (or equivalent) of at least about 300 W, at least about 400 W, at least about 500 W, at least about 600 W, or at least about 800 W (W=watts). The total combined power generation capacity of the device can be about 600 W to about 1,600 W. In a specific embodiment, the mobile, solar-powered device can comprise two solar power modules, each module comprising a solar wing including a solar array formed of a 300 W high efficiency solar panel comprising a plurality of monocrystal solar cells each of which can have a size of, for example, about 6 inches long by about 6 inches wide. Thus, the mobile, solar-powered device would be capable of providing a total power generation capacity of 600 W. In another embodiment, the mobile, solar-powered device can comprise two solar power modules, each module comprising a solar wing including a solar array formed of four 100 W high efficiency solar panels. Thus, the mobile, solar-powered device would be capable of providing a total power generation capacity of 800 W. More particularly, the solar panels may comprise a plurality of monocrystal solar cells having a size of, for example, about 5 inches long by about 5 inches wide, and the panels can be linked in series and/or in parallel to maximize amps generated by the system/MPPT controller and minimize time to recharge the batteries with a minimum footprint (physical size) of solar array. In other embodiments, solar panels and solar cells of further types and sizes recognizable as useful in light of the present disclosure could be used.

The solar power modules may be pivoted from the fully down position to a fully up position (or any position in between) via automatic or manual control. To assist with position control, the solar power modules may comprise one or more position control devices, such as springs, shocks, lift assist devices, locking mechanisms, or the like. Such devices particularly may be useful to prevent the solar power modules from accidentally pivoting out of a desired position and may reduce shock and prevent breakage.

In specific embodiments, the inventive mobile, solar-powered lighting device can comprise actuators attached to the base housing unit and attached to the solar power modules (which each can comprise a combination of a solar wing and one or more solar arrays). Such actuators may be effective to controllably pivot the solar power module between the down position and the up position. Preferably, in the down position, the solar power modules substantially engage (e.g., recess in or rest on) the side walls of the base housing unit. The actuators may be electronically controlled to pivot the solar power modules to a defined angle relative to the ground. Referring to FIG. 7, actuators (562 and 563) are positioned to be recessed in the side wall 180 of the base housing unit 20 behind the solar power module 50. Specifically, the actuators (562 and 563) are attached to wall plates that make up the secondary recesses (182 and 183) formed in the primary recess 181 in the side wall 180 to which the solar power module 50 is pivotally attached. Of course, such construction could apply to the opposing side wall 160. The actuators can be electronically controlled as further described below for automatically pivoting the solar power modules to the desired angle to optimize incident light on the solar power modules in relation to the latitude of the global position of the device at the time of use. Preferably, the solar power modules are positioned at an angle such that the solar radiation strikes the modules at about a 90° angle. This may be achieved by pivoting the solar power modules to a desired angle relative to the ground that is based upon the latitude of the global position of the device at the time of use. In the embodiment of FIG. 7, the mobile, solar lighting device 10 can be characterized as being positioned such that the viewed side is facing approximately north and the opposite side is facing approximately solar south to receive incident light in the northern hemisphere.

In some embodiments, the solar power modules may include one or more telestruts (element 55 illustrated in FIG. 3) (i.e., telescoping support braces) that may be locked into a user-defined position, such as via locking pin components through any desired pin hole within the telescoping support. Such telestruts are typically secondary supports but can be primary supports when used in high wind areas, or as otherwise needed to provide additional support to the solar power modules. Such telestruts may be positioned in one or more locations between a side wall or primary recess of a side wall and the solar power module attached to the side wall. There may be pivoting attachments on one end of the telescoping brace and fixed attachments on either the side wall or the solar wing to temporarily or permanently connect the supporting braces. One or more telestruts or sets of telestruts may be included on each side wall for use with each solar module.

The mobile, solar-powered lighting device further comprises one or more batteries or battery banks for receiving and storing energy obtained by the solar power modules. The batteries can be components of a solar power storage module. Individual batteries or battery banks may be charged independently of other batteries or battery banks, and a single solar power module may be electrically coupled to a specific battery or battery bank so that the battery or battery bank is charged only when the coupled solar power module is receiving incident sunlight. As illustrated in FIG. 4, the batteries (605, 610, 615, and 620) may be positioned within the base housing unit 20 and are particularly positioned on the floor 102 of the trailer frame 100 within a bottom battery frame 104 for stability. In further embodiments, a top battery frame (not illustrated) may be positioned atop the batteries (and optionally attached to the bottom battery frame) to further secure the batteries. In FIG. 4, batteries 605 and 620 may be coupled to form a first battery bank, and batteries 610 and 615 may be coupled to form a second battery bank. In other embodiments, a defined compartment (in addition to the base housing unit) for storing the batteries could be included, and such battery storage compartment could be positioned within the base housing unit or could even be positioned underneath the trailer frame.

Any number of batteries with various voltage configurations and/or amp hour capacities could be used in the mobile, solar-powered lighting device to provide the desired power storage and output for powering the lighting module. In one embodiment, two independent 24 VDC (V=volts and DC=direct current) battery banks may be used, and each battery bank may comprise one or a plurality of batteries. Preferably, every independent battery bank (e.g., comprising one or more batteries per bank) provides a storage and release capacity of at least about 400 amp hours. In other embodiments, the device can comprise a combination of 6 VDC flooded, rechargeable, deep-cycle, lead acid batteries that can provide, for example, up to about 450 amp hours in capacity. In another embodiment, a combination of 6 VDC AGM, rechargeable, sealed, no maintenance, deep-cycle, lead acid batteries may be used and may provide, for example, up to about 450 amp hours in capacity. In still another embodiment, a combination of 12 VDC AGM, rechargeable, sealed, no maintenance, deep-cycle, lead acid batteries can be used and can provide, for example, up to about 245 amp hours or up to about 490 amp hours in capacity. Of course, the invention is not limited to these exemplary embodiments, and any type of batteries or battery banks may be used, as well as any further applicable energy storage devices. The batteries may provide a specific power output, such as at least about 6 VDC, at least about 12 VDC, at least about 18 VDC, at least about 24 VDC, at least about 36 VDC, or at least about 48 VDC. Although the batteries are typically recharged using the current generated by the solar power modules, in some embodiments, the mobile, solar-powered lighting device may comprise a secondary battery charging component that can function to recharge the batteries using an alternating current (AC) or direct current (DC) source. For example, a 24 VDC 40 aH dual battery bank charger may be included to provide for relatively rapid charging of the batteries when needed or at times or high use or when access to solar power is limited. A battery charger 630 can be located inside the base housing unit 20 with an external electrical receptacle/plug/outlet 631 to allow an operator to provide a rapid charge to the batteries (including simultaneous charging of all battery banks when multiple battery banks or sets are included). This allows for a backup or secondary way of charging the batteries when the primary charging provided by the solar power modules is insufficient. This is especially useful for heavy system utilization, particularly during long winter nights (e.g., when light use may be increased) and short winter days (e.g., where solar gain is reduced). In even further embodiments, additional means of recharging the batteries using renewable energy sources may be included in the mobile lighting device of the invention. For example, means for creating energy from wind power (e.g., a wind mill or similar component) may be included in the mobile lighting device.

The lighting module 700 can comprise any scope of materials useful to illuminate a localized area. As seen in the embodiment of FIG. 3, four lighting units (705, 710, 715, and 720)—which may be referred to a fixtures—are coupled to a lighting frame 750 (or T-bar) that is connected to a top end portion of the third mast section 85 (i.e., the top, terminal end of the mast 80). The lighting units, as illustrated, include support yokes (705B, 710B, 715B, and 720B) that enable individually turning and/or tilting each lighting unit to customize illumination. Each lighting unit comprises a suitable light source and associated components, including structural and protective components. In some embodiments, the lighting module may comprise a single lighting unit or any number of a plurality of lighting units. In specific embodiments, the lighting module may comprise one or more light banks that may be separately controllable and that may be comprised of one or more light units.

Any light source capable of emitting a suitable quantity and quality of light to illuminate a desired area may be used in the lighting module of the invention. For example, the lighting module may comprise a semiconductor light source, such as light emitting diodes (LEDs). LEDs are particularly useful because of the ability to provide excellent lighting with relatively low energy requirements, extended lifetime, and durability. In other embodiments, the lighting module may comprise an electrodeless lamp (e.g., plasma lamps and induction lamps) or a gas-discharge lamp, including low pressure discharge lamps (e.g., fluorescent lamps and low pressure sodium lamps). In certain embodiments, one or more combinations of lighting types may be used in the lighting module of the present invention. In specific embodiments, the lighting module provides illumination that at least meets the basic maintained illuminances per IESNA (Illuminating Engineering Society of North America) RP-20-98 standards (i.e., a minimum horizontal illuminance of at least about 0.2 foot candles (FC), a uniformity ratio—maximum to minimum illuminance—of 20:1, and a minimum vertical illuminance of at least about 0.1 FC).

As noted previously, the mast 80 of the mobile, solar-powered light device 10 can be one or more of extendable, pivotable, and rotatable. In certain embodiments, the inventive device thus can comprise one or more components useful to facilitate extension, pivoting, and/or rotation. For example, FIG. 3 shows an embodiment of the mobile, solar-powered light device 10 wherein the mast 80 is in an up position (i.e., is substantially vertical), and wherein the mast 80 is extended to maximize the height of the lighting module 700. In this embodiment, the second mast section 84 engages the first mast section 82 in a telescoping engagement to facilitate extension and contraction of the mast 80 so the length thereof can vary as needed. For example, the mast 80 may be extendable to position the lighting module 700 to a defined height above ground level (which may be measured at about a midpoint of the lighting module—e.g., along the horizontal axis formed by the lighting frame 750—or which may be measured at the highest point on the lighting module). In some embodiments, the mast 80 may be extendable such that the lighting module 700 can be positioned at a height of about 8 feet to at least about 15 feet, a height of about 10 feet to at least about 20 feet, a height of about 10 feet to at least about 25 feet, a height of about 12 feet to at least about 28 feet, or a height of about 12 feet to at least about 30 feet relative to the ground. The mast 80 may be constructed out of any material useful to provide durability and strength, as well as functionality, such as steel, aluminum, other metals or metal alloys, plastics, composite materials, and the like.

Extension of the mast may be manually or automatically controlled, such as through use of a winching component 770 (which may be referred to as a telescoping winching component, specifically) including a cable 771 connection. In particular embodiments, the winching component 770 may comprise a gear-driven cable winch and pulley system, which may be operated by a hand crank, a motor, or similar applicable system. A tensioning mechanism (e.g., a spring) may be included in the mast 80 to maintain tension on the winching component 770 and provide for ease of extension and contraction (or telescoping) of the two, three, or more stages or sections of the mast 80 for customization of the height of the mast 80 and/or the lighting module 700 attached thereto.

A similar winching component 780 (which may be referred to as a pivot winching component) may be used to facilitate pivoting of the mast 80 between the down position (i.e., substantially horizontal) and the up position (i.e., substantially vertical). Such pivoting of the mast likewise may be manually or automatically controlled. A tensioning mechanism 89 (e.g., a spring) may be included, such as between the mast 80 and the primary mast support vertical plate 305.

The mast 80 may comprise one or more components useful to facilitate rotation of the mast 80 so that the illumination provided by the lighting module 700 can be directed as desired without requiring rotation of the entire mobile, solar-powered lighting device 10. As seen in FIG. 6, the mast base 86 can include a collar 380 that encircles the mast 80 and includes a locking mechanism 385 that engages the mast 80. When the locking mechanism 385 engages the mast 80, it is locked into position. When the mast rotation locking mechanism 385 is disengaged, the mast 80 may rotate, and the mast rotation locking mechanism 385 can then be engaged to lock the mast 80 into the newly rotated position. In specific embodiments, the mast rotation locking mechanism may engage only a particular portion of the mast 80, such as the first mast section 82, the second mast section 84, or a further mast section if included. As seen in FIG. 7, the end plate 88 of the mast base 86 provides support to the bottom end of the mast so that the mast 80 may rotate within the confines of the collar 385 when the mast rotation locking mechanism 385 is disengaged.

The base housing unit 20 further may comprise a unit control module 200, which may comprise a housing to cover various user and service controls and monitoring devices and restrict access thereto. The unit control module 200 may house one or more user-accessible controls for one or both of turning the lighting module 700 on and off and actuating the one or more solar power modules (40 and 50) between a down position and an up position. In specific embodiments, the unit control module 200 may include actuator controls for setting the desired angle of the solar power modules (40 and 50), as already described above, to optimize incident light on the solar panels in relation to the global latitude of the device during charging of the batteries. Such controls could specifically control electronic actuation of the solar power modules. As seen in FIG. 1, even in the closed or down position, the solar power module 40 is still in position to receive any available sunlight and thus effectuate charging of the batteries; however, charging can be optimized (e.g., sped up by increasing the electrical current formed by the solar arrays) by raising the solar power modules to the proper angle relative to the ground so that the incident sunlight hits the solar arrays at about a 90° angle. In some embodiments, the unit control module also may include controls for discontinuing charging of the batteries. For example, the unit control module can include a maximum power point tracking (MPPT) solar, battery charge and load controller for maximizing solar gain (i.e., wattage and current) as well as prevent overcharging or over-discharging of the batteries and for optionally controlling the lighting module. Since the solar power modules are always in position to receive some amount of any incident light, it may be desirable to disable charging of the batteries from any current formed by the solar power modules to prevent over-charging of the batteries, and the mobile, solar-powered lighting device 10 may particularly include components and controls necessary to achieve this function as well.

The unit control module 200 also may comprise necessary elements to provide electronic control of the lighting module 700. Specifically, the unit control module 200 can include user-defined light controls (e.g., clock timers) or other means of automatically or manually turning the lighting units on and off at defined clock times as well as provide a user-controllable manual override to turn the lights on or off. Such controls can be used to regulate lighting times and prevent over discharging of the batteries. In some embodiments, separate light timer controls may provided to independently control two or more separate banks or sets of lights included in the lighting module 700. The light timer controls can allow a user to set specific clock times for the lighting module to turn on and off automatically (e.g., unattended by an operator). Multiple on/off times can be set per night, and they can vary by the day of the week if desired. Any times can be used and can be changed as needed. In specific embodiments, the light timer control can be toggled between manual and automatic control (e.g., to turn the lights on before the originally programmed time but to allow the lights to turn off automatically at the programmed off time or to turn the lights off before the originally programmed time but to allow the lights to turn on automatically at the next programmed on time). The present inventive device may, in certain embodiments, be characterized by the provision of such automated clock timers (with manual override) that are separate from the main controller and that allow for automated on/off lighting control by a specific clock time and also for manual on/off control of the lights. This is a highly desirable characteristic as end users often prefer to maintain the option to set one or multiple user-defined automated on/off times per night via a clock timer that can also vary by day of the week while retaining the ability to manually override the on time while retaining the automated off times and/or manually turning the system on/off. This is in contrast to known systems using commonly available charge/light controllers designed for unattended street lighting which allow the user only to program automatic on/off settings using a dusk (on) to dawn (off) or dusk (on) plus a certain number of hours before turning the lights off, typically without the option for manual on/off. While such controllers may be sufficient for unattended street lights where the solar panels are installed above the lights, problems arise in actual use with portable light towers where the lights are positioned higher than the solar panels. Known systems cannot easily leave the solar wings up for long unattended periods of time while using the automated settings because when the system lights turn on or the system receives ambient light from adjacent fixed or portable lights, the solar panels below frequently receive enough light that triggers the controller that it must be dawn and automatically turns the lights off during the night. After a period the solar panels then signals the controller there is no light so it turns back on. This off and on cycle during nighttime hours makes such known systems relatively unworkable and impractical.

In some embodiments, the unit control module 200 may include components (e.g., a meter) for displaying the battery state of charge. Where multiple banks or sets of batteries are included in the mobile, solar-powered lighting device, multiple state-of-charge meters may be included. Such battery state-of-charge meters can provide a user with an easy to understand visual display indicating the current battery charge. Other optional performance monitors may be included, such as voltage or hour meters.

In specific embodiments, the mobile, solar-powered lighting device further may comprise control devices for tracking power formation, charge, and discharge to optimize life and durability of the device. Such control devices likewise may be located in the unit control module 200. For example, a maximum power point tracking (MPPT) solar battery charge and load controller for off-grid PV systems can be used. Such MPPT controllers can utilize a smart tracking algorithm that maximizes the energy from the solar power modules and also provides load control to prevent overcharging or over-discharging of the batteries. This can provide for rapid, efficient, and safe battery charging. Multiple controllers can be included, and each controller can run independently. Such MPPT technology can be advantageous to provide an overall increase in the solar charge current flowing out to the battery to assist in a faster recharge (e.g., when compared to traditional pulse width modulation (PWM) only light/charge controllers. The unit control module 200 may be formed as a box-type construction on the exterior surface of the front wall (or other wall of the base housing unit) or may be formed as a recess within a wall of the base housing unit and covered with a door or similar covering.

Since the mobile, solar-powered lighting device is designed to ultimately provide electrical current to power the lighting module and also can comprise multiple components that may require electronic controls for execution of movements and other actions, it is understood that the inventive device will include necessary wiring components such that power generated, stored, and used may be directed as electrical current to the necessary components to carry out the necessary functions described herein. Such wiring components can include circuit breakers and may include power means independent of the main batteries (that power the lighting module) to power the further electronic components of the device (such as the actuators for the solar power modules and the timers for controlling the lighting module).

The mobile, solar-powered lighting device 10 of the invention can be configured to be in a variety of modes. For example, in a transport mode, the mast 80 can be pivoted down to be substantially horizontal. In this mode, in some embodiments, the mast 80 may be engaging the secondary mast support 400. Further, in this mode, the solar power modules (40 and 50) can be in a fully down or lowered position. Specifically, the solar power modules (40 and 50) can be protected in this mode since they can be at least partially recessed within or rest upon the respective side walls (160 and 180). In another example, in a charging mode, the solar power modules (40 and 50) can be pivoted outward or upward to a user-defined angle to optimize receipt of incident sunlight and thus optimize charging of the batteries. In a further example, in a use mode, the mast 80 and the lighting module 700 can be positioned in an up or vertical configuration wherein the mast 80 has been pivoted up from the transport mode. The vertical configuration is user-changeable as desired, such as by extending and contracting the mast 80, by rotating the mast 80, and by angling components of the lighting module 700, such as the yoke mounted light units (705, 710, 715, and 720) and optionally other components as useful.

In embodiments such as illustrated in FIG. 3, the mobile, solar-powered device 10 can be configured to have a built-in redundancy to ensure that the device provides light when needed. Specifically, the device can be configured to provide two (or more) totally independent off-grid solar-powered lighting systems. For example, one solar power module (e.g., a solar wing with associated solar array(s)) can be coupled to a specific battery bank such that the specific solar power module only charges the coupled battery bank. A second solar power module than can be coupled to a second battery bank so that the second solar power module only charges the second battery bank. This ensures that if one solar power module or battery bank becomes damaged or fails, the second solar power module and battery bank can provide power to the lighting module until repairs can be undertaken. In some embodiments, a specific bank of lighting units can be coupled to a specific battery bank and solar power module. Separate controls for the independent systems also can be provided.

In another aspect, the invention further can relate to a method of lighting a defined area. In some embodiments, such method can comprise causing a mobile, solar-powered lighting device as described herein to be positioned in or about the defined area to be illuminated and then causing the device to emit light. This may include carrying out any of the functions described herein, such as pivoting the solar power modules to a defined angle, pivoting the mast from a down to an up position, extending the mast, setting the light controls to turn on or off at a defined time, and/or manually turning the lights on.

In specific embodiments, methods of utilizing the mobile, solar-powered lighting device can comprise one or more of the following: a user may configure the mobile, solar lighting device into a transport mode wherein the mast and the lighting module are configured in a down configuration, and the solar power modules are configured in a closed configuration (these configurations being capable of being locked into place); a user may transport the mobile, solar-powered lighting device in the transport mode without harming other objects, the mast, lighting module, or solar power modules, and such transport may be facilitated by connecting the trailer to a vehicle and pulling it similar to any other trailer; a user may configure the mobile, solar-powered lighting device in a charge mode to charge the batteries, and this can include engaging controls open/close as needed the solar power modules so that sunlight acquisition is optimized, and/or charging the batteries using solar power, wind power, or another power generator or charger; a user may use the lighting module to illuminate an area, which can include extending the mast and the lighting module to a desired height and angle, which can include using winch/pulley systems; a user may use the control system to manually or automatically turn on and/or off the lighting module.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A solar-powered device comprising:
    a. a mobile base unit comprising:
        i. a trailer including a frame and wheels; and
        ii. a housing attached to the trailer and formed of two opposing side walls that each are formed to include a recessed portion, the side walls being interconnected with a front wall and a back wall, and a roof attached to the side walls, the front walls, and the back wall to define an interior of the housing;
    b. solar power modules that convert solar energy into electrical current, the solar power modules being separately attached directly to each of the two opposing side walls of the housing with a pivotal engagement at or near a top portion of the solar power module and at or near a top portion of the side wall and configured to pivot between a down position wherein an entire back surface of each of the solar power modules is received into the recessed portion of the housing side walls and an up position wherein the solar power modules are pivoted away from the recessed portion of the side walls;
    c. a battery enclosed within the interior of the housing, the battery being at least partially rechargeable using the electrical current from the solar power modules; and
    d. a lighting module associated with the mobile base unit that is at least partially powered either directly or indirectly using the electrical current from the solar power module.

2. The solar-powered device of claim 1, wherein the back surface of each of the solar power modules comprises a back plate.

3. The solar-powered device of claim 1, further comprising a control box comprising one or more components that control the solar power modules, the lighting module, or the solar power modules and the lighting module.

4. The solar-powered device of claim 1, further comprising a mast that is attached to the lighting module and the mobile base unit.

5. The solar-powered device of claim 4, wherein the mast is one or more of extendable, pivotable, and rotatable.

6. The solar-powered device of claim 4, wherein the mast is pivotable and wherein the device further comprises a winching component for moving the mast between a down position and an up position.

7. The solar-powered device of claim 4, wherein the mast is extendable and wherein the device further comprises a winching component for moving the mast between an unextended position and an extended position.

8. The solar-powered device of claim 1, further comprising actuators connected to the housing of the mobile base unit and to the solar power modules.

9. The solar-powered device of claim 1, wherein the lighting module is selected from the group consisting of light emitting diodes, electrodeless induction floodlights, gas discharge lamps, and combinations thereof.

10. The solar-powered device of claim 1, further comprising a secondary battery charging component separate from the solar power modules.

11. The solar-powered device of claim 1, comprising two or more independent off-grid solar-powered electric systems that each comprises a solar power module, a battery, and a lighting module.

12. The solar-powered device of claim 1, wherein the lighting module provides illumination per the Illuminating Engineering Society of North America RP-20-98 standards of a minimum horizontal illuminance of at least about 0.2 foot candles (FC), a uniformity ratio (maximum to minimum illuminance) of 20:1, and a minimum vertical illuminance of at least about 0.1 FC.

13. A method of utilizing a mobile solar-powered lighting device, the method comprising:
    a. configuring a mobile solar-powered lighting device in a transport mode wherein the mobile solar-powered lighting device comprises a mobile base unit comprising a trailer and a housing including opposing side walls formed to include recessed portions and also comprises two solar power modules that are independently attached to the opposing side walls with a pivotal engagement at or near a top portion of each of the solar power modules and at or near a top portion of each of the side walls, and wherein the configuring in a transport mode comprises pivoting the solar power modules to a down position wherein an entire back surface of each of the solar power modules is received into the recessed portion of the housing side walls;
    b. transporting the mobile solar-powered lighting device;
    c. configuring the mobile solar-powered lighting device in a charge mode where the solar power modules are pivoted away from the side walls;
    d. charging a battery that is enclosed within the housing the solar power modules attached to the housing of the mobile solar-powered lighting device;
    e. configuring the mobile solar-powered lighting device in a lighting mode; and
    f. lighting an area.

14. The method of claim 13, wherein configuring the mobile solar-powered lighting device in a transport mode includes placing a mast in a down position.

15. The method of claim 13, wherein transporting includes towing the mobile solar-powered lighting device with a vehicle.

16. The method of claim 13, wherein configuring the mobile solar light tower in the charge mode includes pivoting the two solar power modules into a position to optimize receipt of sunlight.

17. The method of claim 13, wherein configuring the mobile solar-powered lighting device in the lighting mode includes raising a mast into a substantially upright position.

18. The solar-powered device of claim 10, wherein the secondary battery charging component comprises an alternating current or direct current charging device.

19. The solar-powered device of claim 10, wherein the secondary battery charging component comprises a wind mill.

* * * * *